June 1, 1965 R. J. H. CLIN ETAL 3,187,108
SUBSCRIBERS' TELEPHONE EQUIPMENT
Filed March 7, 1962
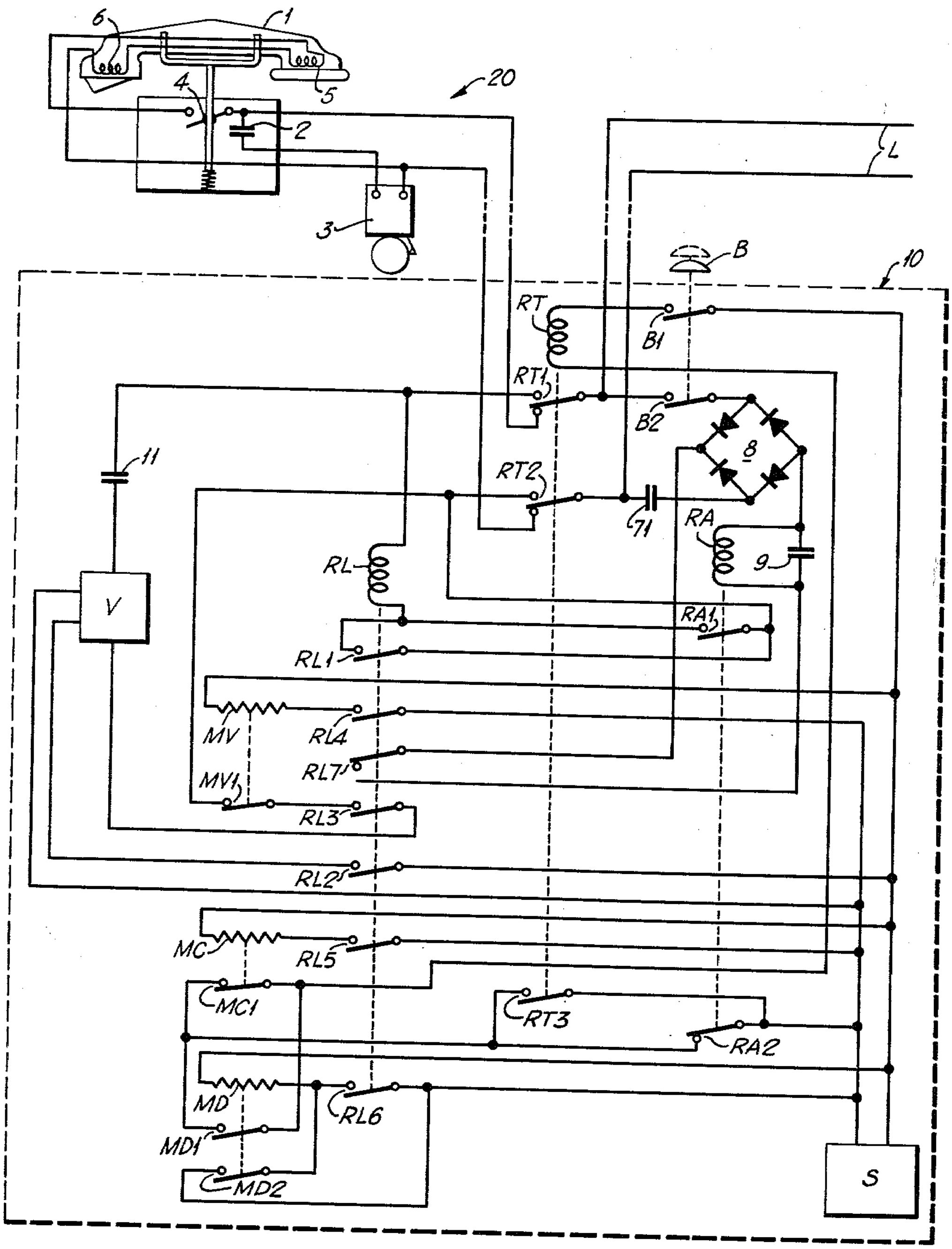

United States Patent Office 3,187,108 Patented June 1, 1965

3,187,108

SUBSCRIBERS' TELEPHONE EQUIPMENT

Roland Jean Henry Clin, 37 Rue la Fontaine, Paris, France, and Raoul Charles Eloi Charlet, 22 Bis Rue de Malleville, Enghien les Bains, Seine et Oise, France Filed Mar. 7, 1962, Ser. No. 178,068
Claims priority, application France, Mar. 8, 1961, 854,974, Patent 1,283,074
7 Claims. (Cl. 179—84)

The present invention relates to a subscribers' telephone equipment comprising a telephone instrument of the ordinary type, connected up to a line of a telephone system and has the object of only establishing a telephonic communication at the subscriber's end after a second call by the caller made a predetermined time after the first call.

This installation comprises an instrument for selecting telephonic communications which, by simply being added to ordinary telephones, without modifying the lines, enables the subscriber's tranquility to be preserved during the time that he puts it into operation. Actually, the caller—after a first call—who does not get through to the person called, is informed by a particular signal or message that the person called does not wish to be disturbed.

If the caller takes the risk of being a nuisance, considering that his call is urgent, he makes a second call at the end of the signal and thus starts the usual bell ringing at the other end.

Should the person called absolutely not wish to be disturbed, placing the station in an off-hook condition prevents any call from reaching him, without affecting the telephone exchange.

Many other objects and advantages of the present invention will become apparent from considering the single sheet of drawings which forms a circuit diagram of a telephone system embodying the present invention.

The system is adapted for use with a conventional subscriber telephone instrument or equipment indicated generally as 20 which is normally connected to a telephone line L through a pair of normally closed contacts RT–1 and RT–2 on a relay RT in a control circuit 10. The subscriber instrument 20 operates in the conventional manner so that when an alternating current ringing signal is coupled to the line and applied to the subscriber equipment 20 through the closed contacts RT–1 and RT–2, it is coupled through a capacitor 2 to energize a bell or ringer 3 to provide an audible indication that the equipment 20 is being called. When the call is answered by removing a handset 1 from the cradle, a hook-switch or cradle-switch 4 is closed to connect a receiver 5 and a transmitter 6 in series across the line L. The direct current shunt provided by closing the switch 4 controls the ring cut-off relay in the central office to remove ring tone from the line L and conditions the equipment 20 for normal telephonic communication over the line L. When the handset 1 is returned to its cradle, the switch 4 is opened to restore the equipment 20 to a normal condition and to permit the release of the extended connection.

When the control circuit 10 is placed in operation, incoming calls from the line L are not extended to the subscriber equipment 20 but are terminated in the control circuit 10. In response to the receipt of a ringing signal indicating that the subscriber equipment 20 is being called, an answer supervisory signal is returned over the line to terminate the application of ringing, and an audible signal or prerecorded message is returned to the calling subscriber indicating that the called subscriber wishes to receive only calls of an important or urgent nature. At the end of the period in which this indication is returned to the calling subscriber, the control circuit 10 is prepared for the receipt of a ringing signal indicating that the calling subscriber wishes to complete a connection to the subscriber equipment 20 and has recalled this station. If a ringing signal is not received within the predetermined time interval, the control circuit 10 is restored to its normal condition. Alternatively, if ringing is received within this period, the connection is extended through the control circuit 10 to the subscriber equipment 20 so that this station is called in the normal manner. This second calling attempt is completed by placing the equipment 20 in an off-hook condition in the manner described above.

As indicated above, the control circuit 10 is normally in an ineffective condition when the incoming line L is connected to the subscriber equipment 20 through the contacts RT–1 and RT–2 on the relay RT in the circuit 10. When the circuit 10 is to be placed in an operative condition, a switch means B is actuated to close the plurality of contacts B–1 and B–2. The closure of the contacts B–2 connects a fullwave rectifier bridge 8 across the incoming line L in series with a capacitor 71. The closure of the contacts B–1 connects the winding of the relay RT across a potential source S over a circuit including a plurality of normally closed contacts MC–1 and RA–2. Energization of the relay RT actuates the contacts RT–1 and RT–2 and also closes a pair of contacts RT–3. The closure of the contacts RT–3 completes a shunt around the contacts RA–2 to maintain the operating circuit for the relay RT when the contacts RA–2 are opened. The actuation of the contacts RT–1 and RT–2 disconnects the incoming line from the path extending to the station or subscriber equipment 20 and connects this line to the output terminals of a signal source V over a circuit including a coupling capacitor 11, a pair of normally closed contacts MV–1, and a pair of normally open contacts RL–3. Thus, when the switch B is actuated, the subscriber equipment 20 is disconnected from the incoming line L, and this line is terminated in the control circuit 10.

When an attempt is made to call the station represented by the subscriber equipment 20, a ringing signal is again applied to the line L and is forwarded through the closed contacts B–2 and the capacitor 71 to energize the fullwave rectifier bridge 8. The potential produced across the output terminals of the bridge 8 is forwarded through a pair of normally closed contacts RL–7 to be applied across the operating winding of the relay RA and a capacitor 9 connected in parallel therewith. Energization of the winding of the relay RA operates this relay to close a pair of contacts RA–1 and to open the contacts RA–2. The opening of the contacts RA–2 does not release the relay RT because of the closed contacts RT–3. The closure of the contacts RA–1 connects the winding of a relay RL directly across the incoming line L and thus provides answer supervison indicating that the call has been terminated in the control circuit 10. This controls the central office to remove the ringing signal from the line. The relay RL closes a plurality of contacts RL–1, RL–2, RL–3, RL–4, RL–5 and RL–6 and opens the contacts RL–7. The closure of the contacts RL–1 completes a holding circuit for the relay RL shunted across the contacts RA–1.

The opening of the contacts RL–7 together with the termination of the application of the ringing signal to the line L causes the relay RA to release. This relay is rendered slow-to-release by the shunting capacitor 9 and remains operated until after the contacts RL–1 are closed to complete the holding circuit for the relay RL. The opening of the contacts RA–1 interrupts the above-described operating circuit for the relay RL, but this relay remains operated over the circuit including the closed contacts RL–1. The closure of the contacts RA–2 does not perform any useful function at this time.

The closure of the contacts RL–2 connects a signal source V to the potential source S so that this signal source is placed in an operative condition. The source V can comprise an audible tone or a prerecorded message advising the calling subscriber that the called subscriber does not wish to be disturbed. The closure of the contact RL–3 connects the output terminals of the signal source V to the line L over a path including the contacts RT–1, RT–2 and MV–1 and the coupling capacitor 11. Thus, the audible tone or the prerecorded message is now returned to the calling subscriber to advise him that the called subscriber does not wish to be disturbed. Since the contacts RL–7 are open, the signals from the source V cannot cause the operation of the relay RA.

The closure of the contacts RL–4, RL–5, and RL–6 energizes the operating windings for three separate timers MV, MC, and MD, respectively. The energization of the timer MD causes the immediate closure of a pair of contacts MD–2. The timer MV terminates the application of the signal from the source V to the line L. More specifically, the timer MV, which can comprise an electrically driven clockwork mechanism or a timer including a heat responsive bimetallic element, opens the normally closed contacts MV–1 after a time delay of around twenty seconds to terminate the transmission of signals from the source V to the line L.

The timer MC operates a period of time after the opening of the contacts MV–1 sufficient to permit the calling subscriber to reinitiate the call and serves to open the normally closed contacts MC–1. When the contacts MC–1 are opened, the above-identified energizing circuit for the winding of the relay RT is interrupted so that the contacts RT–1, RT–2, and RT–3 controlled thereby are returned to their normal positions. The opening of the contacts RT–3 removes the shunt from around the closed contacts RA–2. The actuation of the contacts RT–1 and RT–2 connects the subscriber equipment 20 to the line L and disconnects this line from the previously interrupted path extending to the signal source V. The disconnection of the line L from the control circuit 10 also interrupts the above-described operating circuit for the relay RL so that this relay releases to open the contacts RL–1, RL–2, RL–3, RL–4, RL–5 and RL–6 and to close the contacts RL–7. The closure of the contacts RL–7 prepares the operating circuit for the relay RA, and the remaining contacts merely aid in restoring the control circuit 10 to a normal condition. However, the opening of the contacts RL–6 does not terminate the energization of the operating winding of the timer MD because of the prior closure of the contacts MD–2 when the winding of the timer MD is first energized. The contacts MD–2 provide a shunt around the contacts RL–6. The incoming line L is now connected directly to the terminals of the subscriber equipment 20 so that if the calling subscriber now places a second call to this station, the ringing signal applied to the line L can be coupled through the capacitor 2 to energize the bell 3.

Assuming that the calling subscriber decides not to place the second call necessary for reaching the subscriber equipment 20, no signals are applied to the line L during the time interval that starts with the opening of the closed contacts MC–1 and ends when the timer MD completes its time cycle to close the contacts MD–1. The contacts MD–1 are shunted across the contacts MC–1 and, when closed, complete a circuit for operating the relay RT. The operation of the relay RT actuates the contacts RT–1, RT–2, and RT–3 so that the subscriber equipment 20 is disconnected from the line L, and this line is connected to the control circuit 10. After a delay, the timers MV, MC, and MD are restored to their normal condition.

Assuming, however, that the calling subscriber desires to reach the subscriber equipment 20, a connection to the called line L is established a second time, and a ringing signal is again applied to the line. This signal is forwarded through the contacts RT–1 and RT–2 to energize the bell 3 in the usual manner. This ringing signal is also applied through the fullwave rectifier bridge 8 to operate the relay RA over the circuit described above. When the relay RA operates, the contacts RA–1 are closed but do not cause the operation of the relay RL because this relay is no longer bridged across the incoming line L. The opening of the contacts RA–2, however, interrupts the operating circuit for the relay RT at an additional point to insure that this relay is not reoperated during the interval in which the ringing signal is applied to the line L.

When the call is answered at the equipment 20 of the called station, the answering party actuates the switch means B to open the contacts B–1 and B–2. This disconnects the fullwave rectifier 8 from the line L and also interrupts an additional point in the circuit for the relay RT so that this relay cannot be operated to interrupt the connection between the calling and called subscribers over the line L. The removal of the handset 1 from the cradle places the equipment 20 in an off-hook condition and returns answer supervision to the central office so that the ringing signal is removed. When the call is terminated, the equipment 20 is restored to its normal condition in the usual manner, and the person at the called station actuates the switch means B so that the contacts B–1 and B–2 are again closed. This causes the reoperation of the relay RT in the manner described above so that the subscriber equipment 20 is disconnected from the line L, and this line is again connected to the control circuit 10.

Although the present invention has been described with reference to a single illustrative embodiment thereof, it should be understood that numerous other modifications and embodiments can be devised by those skilled in the art that will fall within the spirit and scope of the principles of this invention.

What is claimed and desired to be secured by Letters Patent of the United States is:

1. In a telephone system, a line, a subscriber station including audible indicating means responsive to a ringing signal, switching means for selectively connecting the station to the line and normally in a condition in which the line is not connected to the station, detecting means connected to the line and responsive to the ringing signal, timing means, and control means including said timing means and said detecting means for operating the switching means to connect the line to the subscriber station a selected time interval after the ringing signal has been removed from the line.

2. The telephone system set forth in claim 1 including means controlled by the timing means for releasing the switching means to disconnect the subscriber station from the line a predetermined period following the connection of the line to the subscriber station.

3. In a telephone system, a line, a subscriber station including audible indicating means responsive to a ringing signal, switching means for selectively connecting the station to the line and normally in a condition in which the line is not connected to the station, detecting means connected to the line and responsive to the ringing signal, first means controlled by the detecting means for applying a signal to the line indicating that the desired connection to the station is not being completed, and second means controlled by the detecting means for connecting the station to the line for a predetermined length of time following the receipt of ringing signal from the line by the detecting means.

4. In a telephone system, a subscriber station including audible indicating means responsive to a ringing signal, switching means for connecting the station to the line and normally in a setting in which the line is not connected to the station, and control means responsive to a ringing signal on the line for applying an answer signal to the line to remove the ringing signal and for operating the switching means to connect the station to the line for a predetermined interval of time to permit the station to be called in the normal manner during only the predetermined interval of time following the receipt of the ringing signal.

5. The system set forth in claim 4 including signaling means controlled by the control means for applying a signal to the line indicating that the station can be reached by placing a call to the station in the predetermined interval.

6. The system set forth in claim 4 including timing means placed in operation by the receipt of ringing signals and operable to control the operation of the switching means.

7. The system set forth in claim 4 including means for disabling the control means and operating the switching means to continuously connect the line to the station.

References Cited by the Examiner

UNITED STATES PATENTS

| | | | |
|---|---|---|---|
| 2,481,840 | 9/49 | Hardgrave | 179—84 |
| 2,715,161 | 8/55 | Lutz et al. | 179—89 |
| 3,033,941 | 5/62 | Bell et al. | 179—89 |
| 3,126,453 | 3/64 | Friend et al. | 179—89 |

ROBERT H. ROSE, *Primary Examiner*.

WALTER L. LYNDE, *Examiner*.